United States Patent [19]
Asanuma et al.

[11] Patent Number: 5,045,597
[45] Date of Patent: Sep. 3, 1991

[54] α-OLEFIN BLOCK COPOLYMERS AND PROCESSES FOR PREPARING THE SAME

[75] Inventors: Tadashi Asanuma; Kazuhiko Yamamoto; Junko Ohnaka, all of Osaka; Yoshiko Tokura, Wakayama, all of Japan

[73] Assignee: Mitsui Toatsu Chemicals, Inc., Tokyo, Japan

[21] Appl. No.: 489,783

[22] Filed: Mar. 5, 1990

Related U.S. Application Data

[62] Division of Ser. No. 271,864, Nov. 16, 1988, abandoned.

[30] Foreign Application Priority Data

Nov. 17, 1987 [JP] Japan ................................ 62-288304
Dec. 9, 1987 [JP] Japan ................................ 62-309427
Feb. 8, 1988 [JP] Japan ................................ 63-193200
May 20, 1988 [JP] Japan ................................ 63-123483
May 24, 1988 [JP] Japan ................................ 63-124957
May 26, 1988 [JP] Japan ................................ 63-126913
Jul. 11, 1988 [JP] Japan ................................ 63-171020

[51] Int. Cl.$^5$ .................. C08L 53/00; C08L 23/00; C08F 293/00; C08F 297/08
[52] U.S. Cl. .................................... 525/72; 525/268; 525/288; 525/247
[58] Field of Search ................... 525/288, 72, 268

[56] References Cited

U.S. PATENT DOCUMENTS 3,949,018  4/1976  Agouri et al. ................. 525/288
4,143,089  3/1979  Martin ............................. 525/288

FOREIGN PATENT DOCUMENTS

WO87/03601  6/1987  World Int. Prop. O. .......... 525/288

Primary Examiner—Carman J. Seccuro
Attorney, Agent, or Firm—Burns, Doane, Swecker & Mathis

[57] ABSTRACT

The present invention relates to α-olefin block copolymers excellent in adhesive property to polar group-containing polymers and metals as well as in rigidity comprising an alkenylsilane and an α-olefin and processes for preparing the same, materials for adhesion and for easy coating comprising the same.

57 Claims, No Drawings

α-OLEFIN BLOCK COPOLYMERS AND PROCESSES FOR PREPARING THE SAME

This application is a divisional of application Ser. No. 07/271,864, filed Nov. 16, 1988, now abandoned.

FIELD OF THE INVENTION

The present invention relates to novel α-olefin block copolymers, processes for preparing the same and uses thereof. More specifically, the invention relates to block copolymers comprising an alkenylsilane and an α-olefin, processes for preparing the same and uses thereof.

Polymers of α-olefins are inexpensive and have relatively well-balanced properties and thus are employed for a variety of uses. With a view toward improving property balance, various improvements have been made to random or block copolymers formed by polymerizing different α-olefins with each other.

However, polymers of α-olefins are poorer in adhesive properties than polymers having polar groups or metals due to characteristics of their chemical structure. Further, when a coating or the like is applied to an article molded from an α-olefin polymer, the coating or film is liable to peel off due to the absence of adhesive property between the film and the α-olefin polymer. Further, polymers of α-olefins, other than polyethylene, are disadvantageous in that they have relatively low crystallinities and therefore do not exhibit such properties as rigidity to a sufficient extent.

SUMMARY OF THE INVENTION

The present invention overcomes the problems and disadvantages of the prior art by providing an β-olefin block copolymer containing an alkenylsilane and an β-olefin.

A random copolymer of an alkenylsilane and an β-olefin is disclosed in U.S. Pat. Nos. 3,223,686 and 3,644,306. However, a block copolymer of an alkenylsilane and an α-olefin has not been previously discovered.

It is an object of this invention to provide a material for adhesion which is capable of easy bonding, for example, by binding the α-olefin block copolymer with heat.

It is a further object of this invention to provide a material for easy coating, a molded article of which is easy to coat on its surface and which is obtained, for example, by thermoforming the α-olefin block copolymer.

Additional objects and advantages of the invention will be set forth in part in the description which follows, and in part will be obvious from the description, or may be learned by practice of the invention. The objects and advantages of the invention will be realized and attained by means of the instrumentalities and combinations, particularly pointed out in the appended claims. To achieve the objects and in accordance with the purpose of the invention, as embodied and broadly described herein, the invention comprises an α-olefin block copolymer which is obtained by first polymerizing an alkenylsilane and then polymerizing an α-olefin in the presence of a stereoregular catalyst.

The α-olefin block copolymer of this invention is excellent in adhesive and coating properties as well as in rigidity and therefore is of great industrial value.

DETAILED DESCRIPTION OF THE INVENTION

The preferred alkenylsilane compounds useful in the practice of this invention have the formula (I):

$$H_2C=CH-(CH_2)_n-SiH_m(R_{3-m}) \qquad (I)$$

wherein n is 0 or an integer of from 1 to 12, R is selected from the group consisting of a methyl, phenyl and a halogen radical and m is an integer of from 1 to 3.

Preferably, the α-olefin used in the practice of this invention is a $C_2-C_{12}$ olefin, more preferably, a $C_2-C_6$ olefin such as ethylene, propylene, butene-1, pentene-1 and a mixture of two or more of these compounds. Further, each of the abovedescribed olefins or a mixture thereof may also be mixed with a higher olefin such as hexene-1, octene-1 or 4-methylpentene-1 in an amount of up to about 20 weight percent based on the total olefins.

The stereoregular catalyst useful in the practice of this invention is preferably a catalyst system composed of a transition metal compound, an organoaluminum compound and optionally a stereoregularity improver such as oxygen-containing organic compounds. There is no particular limitation on the catalyst system. Exemplary suitable catalyst systems are disclosed in Ziegler-Natta Catalysts and Polymerization by John Boor Jr. (Academic Press), Journal of Macromolecular Science-Reviews in Macromolecular Chemistry and Physics, C24(3) 355-385 (1984), ibid. C25(1) 578-597 (1985).

The transition metal compound is preferably a titanium halide compound such as titanium trichloride which is obtained by reducing titanium tetrachloride with metallic aluminum, hydrogen or an organoaluminum compound; or those obtained by modifying the titanium trichloride with an electron doner. The transition metal compound may also be obtained by carrying a titanium halide on a carrier such as magnesium halide or on a compound obtained by treating the carrier with an electron doner.

The organoaluminum compound is preferably selected from the group consisting of a trialkylaluminum, a dialkylaluminum halide, an alkylaluminum sesquihalide and an alkylaluminum dihalide. Preferably the alkyl groups of these compounds are selected from the group consisting of methyl, ethyl, propyl, butyl and hexyl groups, and the halide groups are selected from the group consisting of chlorine, bromine and iodine.

Preferably, the stereoregularity improver and the electron doner contain oxygen-containing compounds such as ethers, esters, orthoethers and alkoxy-silicon compounds. Further, alcohols, aldehydes and water may be used as the electron doner.

The polymerization ratio by weight of the alkenylsilane to the α-olefin in the α-olefin block copolymer of this invention preferably ranges from about 1:10 to about 1:1,000,000, more preferably from about 1:20 to about 1:100,000.

Preferably, the polymerization of an alkenylsilane is conducted by the solvent polymerization or vapor-phase polymerization process, such as by well-known processes and conditions for polymerizing α-olefins. Generally, polymerization of an β-olefin is conducted at a temperature of from about 0° C. to about 200° C., preferably from about 25° C. to about 150° C. under a pressure of from about atmospheric pressure to about the vapor pressure of the alkenylsilane at the polymerization temperature.

No particular restrictions are imposed on the polymerization process to be adopted for polymerizing an α-olefin. The bulk polymerization and vapor-phase polymerization processes may also be employed in addition to the solvent process in which a inert solvent is used.

The temperature and pressure at which the polymerization process is carried out is well known in the art. Conditions such as those employed in the polymerization of ordinary α-olefins may be used without modification. The temperature and pressure conditions are preferably in the range of from about 0° C. to about 200° C. and from about atmospheric pressure to about 150 kg/cm$^2$, more preferably in the range of from about room temperature to about 150° C. and from about atmospheric pressure to about 100 kg/cm$^2$, respectively.

Upon polymerizing an α-olefin subsequent to the polymerization of an alkenylsilane, it is a common practice to first remove unreacted alkenylsilane and then polymerize the α-olefin. However, it is also possible to conduct the polymerization by introducing an α-olefin into unreacted alkenylsilane.

No particular limitation is placed on the molecular weight of the copolymer and hence the molecular weight may be determined in accordance with the purpose of use. A desired molecular weight can be obtained by adding hydrogen to regulate the molecular weight. The desired molecular weight varies to some extent depending on the desired use, i.e., whether it is to be used as a material for molding such as injection molding, a material for adhesion such as a laminating adhesion, a material for easy coating, or a molded article suitable for surface coating.

When the block copolymer of the invention is to be used as a blend with other polyolefins, a desired molecular weight of the copolymer can be achieved by adjusting its intrinsic viscosity measured at 135° C. in a tetralin solution to preferably from about 0.1 to about 5 dl/g, more preferably from about 0.05 to about 3 dl/g.

The α-olefin block copolymer of this invention can be used by blending it with another polyolefin in some of the above-described uses. Other polyolefins suitable to be blended with the copolymer of the invention include homopolymers and random or block copolymers of α-olefins which are illustrated above and obtained in accordance with an ordinary polymerization process in the presence of an ordinary catalyst as used in this invention.

There is no particular limitation on the mixing procedure employed upon mixing the copolymer with other polyolefins. A conventional procedure such as premixing the copolymer and polyolefins in a Henschel mixer and melt-blending the resulting mixture in a extruder followed by granulation would be sufficient. It is also feasible to heat them upon mixing in a Henschel mixer or to mix them by means of a roll. During mixing, various well-known additives such as stabilizers may be added.

The α-olefin block copolymer of this invention may be utilized as a material for adhesion. Specifically, the aforementioned polymer may be employed as an adhesive for a polar group-containing polymer, for example, polyamide, polyester, polyether or ethylene-vinyl alcohol copolymer, or a metal, for example, aluminum, steel sheet, soft iron sheet or galvanized iron sheet. In this case, the copolymer may be used by diluting it with another polyolefin, as described above. When utilized as an adhesive polyolefin, an alkenylsilane is preferably present in an amount of from about 10 weight ppm to about 1 weight percent.

The material for adhesion of this invention is generally used in such a way that it is held between the layers of a polyolefin and a polar group-containing polymer to bind both layers. However, it is also possible to use the material as a formation composed of a polyolefin layer and a layer composed of the α-olefin block copolymer of the invention as it is or by mixing it with another polyolefin.

The α-olefin block copolymer of this invention may also be utilized as a material for easy coating. In coating, the above-described composition for adhesion can be used without modification. However, to improve its adhesive properties the composition may also be used by adding to it a compound wellknown in the art as a siloxane condensation catalyst, such as an organic acid or salt thereof, an organic base, an alkoxy compound, hydroxide or oxide of alkali metals or alkaline earth metals, or a tin or lead salt of carboxylic acids.

When being used as a material for easy coating, the composition of the invention is first formed into a desired shape and then coated. No particular restrictions are imposed on the coating to be used for this purpose. For example, urethane coatings, acrylic coatings, and the like may be used.

The invention will further be clarified by the following examples, which are intended to be purely exemplary of the invention.

EXAMPLE 1

An oscillating mill equipped with 4 grinding pots which contained 9 kg of steel balls having a diameter of 12 mm and an inner volume of 4 liters were employed. In each pot, 300 g of magnesium chloride, 60 ml of tetraethoxysilane and 45 ml of α,α,60 -trichlorotoluene were added and ground for 40 hours in an atmosphere of nitrogen. The ground mixture thus-obtained (300 g) was charged in a 5 liter flask. 1.5 liters of titanium tetrachloride and 1.5 liters of toluene were added to the ground mixture, followed by stirring at 100 C. for 30 minutes. The supernatant was removed. An additional 1.5 liters of titanium tetrachloride and 1.5 liters of toluene were added to the solid portion obtained, followed by stirring at 100° C. for 30 minutes. The resultant supernatant was removed and the solid portion was washed repeatedly with n-hexane, thereby obtaining a transition metal compound slurry. A part of the slurry was taken out as a sample and its titanium content was analyzed. It was found to be 1.9 weight percent.

To a pressure-tight glass autoclave having an inner volume of 200 ml the following were added: 40 ml of toluene, 20 ml of the above-described transition metal compound slurry, 0.128 ml of diethylaluminum chloride, 0.06 ml of p-toluic acid methyl ester and 0.03 ml of triethylaluminum in an atmosphere of nitrogen. To the resultant mixture 0.5 g of vinylsilane was charged under pressure, followed by polymerization under stirring at 20° C. for 60 minutes. Then, 0.05 ml of trimethylaluminum was added and the resulting catalyst slurry was fed into an autoclave having an inner volume of 5 liters, to which 1.8 kg of propylene and 3.3 Nl of hydrogen were added. The resultant mixture was subjected to a polymerization reaction at 75° C. for 2 hours. After the polymerization reaction, unreacted propylene was purged to obtain a polymer, which was then dried at 80° C. and 60 mmHg for 12 hours. A powder of a block copolymer (380 g) was obtained and its intrinsic viscosity (hereinafter abbreviated as $\eta$) was measured at 135° C. in a tetralin solution. Further, the rate of extraction residue was determined when the powder was extracted with boiling n-heptane for 6 hours in a Soxhlet's extracter. The result was given in terms of the weight percentage of the powder after extraction to the powder before extraction. After polymerization of vinylsilane without carrying out the following $\alpha$-olefin polymerization, the amount of vinylsilane polymerized was measured per unit amount of the transition metal compound and was found to be 2.4 g equivalent. The rate of conversion of vinylsilane was 10% in the polymerization process.

The polymerization was repeated 20 times in the same manner to obtain about 6 kg of powder. A phenol type stabilizer and calcium stearate were added to a part of the powder in weight ratios of 10 to 10,000 and 15 to 10,000 respectively. The resulting mixture was granulated to prepare an injection sheet having a thickness of 1 mm. Then, the flexural rigidity of the sheet was measured. Further, the melting point and crystallizing temperature were measured at maximum peak temperatures by raising or decreasing the temperature at a rate of 10° C./min. by means of a differential-thermal analysis instrument.

The melting point was 160° C., the crystallizing temperature was 122.5° C., the melt flow index (according to ASTM D1238 (230° C).; hereinafter abbreviated as MI) was 7.8 g/10 min., and the flexural rigidity (according to ASTM D747063(20° C.)) was 12,100 kg/cm$^2$.

In order to determine the strength of adhesion, a sheet of Eval (product of Kuraray Co., Ltd., EP-F) having a thickness of 0.2 mm was put on a sheet formed by injection-molding the above-described powder and having a thickness of 0.2 mm. The resulting sheets were pressed at 220° C. and 4 g/cm$^2$ for 3 minutes. The peel strength of the piled sheets was determined. It was found to be not less than 2 kg/cm.

Measurement of Peel Strength

The T-type peel strength was measured for a specimen having a width of 2.5 cm at 23° C. and a pulling rate of 100 mm/min. by the use of an Instron tensile testing machine.

To determine the strength of coating, the aforesaid granulated product was further compression-molded at 220° C. and 40 kg/cm$^2$ to obtain a sheet having a thickness of 1 mm. Specimens of the sheet were separately coated with two kinds of coatings (Olestar Q 182 (trade name: product of Mitsui Toatsu Chemicals, Inc.) as a urethane coating and Unirock (trade name: product of Rock Paint, Inc.) as an acrylic coating by brush. The specimens were baked and dried in an air oven at 60° C. for 30 minutes. The strength of adhesion of the coated film was measured for the specimens applied with the coatings according to the procedure of JIS K-5400 (the cross hatch test). The numbers of cross-cut residual coated films were respectively as excellent as 80 and 95 out of 100.

The amount of polymerized vinylsilane in the polypropylene was calculated by analyzing silicon and was found to be 140 ppm.

COMPARATIVE EXAMPLE 1

Propylene was polymerized in the same manner as in Example 1 except that vinylsilane was not used, whereby 475 g of polypropylene was obtained. Using the polypropylene, evaluation was made in the same manner as in Example 1. The MI was found to be 6.1 g/min., the crystallizing temperature was 110.5° C., the melting point was 160° C., and the flexural rigidity was 11,200 kg/cm$^2$. The adhesive property was judged as autogeneous peeling, and the numbers of cross-cut residual coated films were respectively 5 and 10 out of 100, the both numbers being evaluated as poor.

EXAMPLE 2

A commercially-available highly-active titanium trichloride (product of Toho Titanium Co., TAC S-21) was used as a transition metal compound. In toluene, 100 mg of the titanium trichloride, 1.0 ml of diethylaluminum chloride and 0.5 g of vinylsilane were subjected to polymerization at 30° C. for 30 minutes. The resulting slurry was charged in an autoclave having an inner volume of 5 liters, to which 1.8 kg of propylene and 4.4 Nl of hydrogen were added. Polymerization was conducted at 75° C. for 1 hour to obtain 265 g of polypropylene. The polypropylene was treated with heat at 100° C. for 1 hour in the presence of 10 ml of propylene oxide, which is a catalyst deactivation agent. The analysis of the resulting polypropylene revealed the polymerization of 720 ppm of vinylsilane. Similar polymerization was repeated 20 times to obtain about 5 kg of the polymer.

Then, propylene was separately polymerized to obtain polypropylene having an $\eta$ of 1.65 and a rate of extraction residue of 97.1%. Polymerization was repeated similarly to obtain about 10 kg of the polymer. To 200 g of the polypropylene powder, 40 g of the above-described copolymer, a phenol-type stabilizer in a weight ratio of 10 to 10,000 (based on the polypropylene) and calcium stearate in a weight ratio of 15 to 10,000 (based on the polypropylene) were added. The mixture thus formed was granulated to prepare a material of this invention. The material had an MI of 7.8 g/10 min., a crystallizing temperature of 120.8° C., a melting point of 160.1° C. and a flexural rigidity of 2,200 kg/cm$^2$. The material was evaluated as a material for adhesion in the same manner as in Example 1. It was found to have a peel strength of not less than 2 kg/cm$^2$. The material was also evaluated as a material for coating in the same manner as in Example 1. The numbers of cross-cut residual coated films were respectively as excellent as 90 and 95 out of 100.

COMPARATIVE EXAMPLE 2

Evaluation was made using the homopolymer of propylene obtained in Example 2 in place of the copolymer of vinylsilane. It had an MI of 8.5 g/min., a melting point of 160.5° C. and a crystallizing temperature of 112.5° C. The flexural rigidity of the injection sheet was 10,900 kg/cm$^2$ and the adhesive property thereof was judges as autogeneous peeling. The numbers of cross-cut residual coated films were respectively as poor as 5 to 10 out of 100.

EXAMPLE 3

A propylene-ethylene copolymer containing 3.5 weight percent of ethylene and having an $\eta$ of 1.88 was obtained by conducting the polymerization in the presence of a small quantity of ethylene in the same manner as in Comparative Example 1. To 200 g of the copolymer powder were added 20 g of the block copolymer comprising vinylsilane and propylene obtained in Example 2, a phenol-type stabilizer in a weight ratio of 10 to 10,000 (based on the polyolefin) and calcium stearate in a weight ratio of 15 to 10,000 (based on the polyolefin). The resulting mixture was granulated to obtain a material for coating. The material was used for easy coating. Evaluation of the material was made in the same manner as in Example 1. The numbers of cross-cut residual films were respectively found to be as high as 85 and 90 out of 100.

EXAMPLE 4

Polymerization was conducted in the same manner as in Example 1 except that allylsilane was used instead of vinylsilane. The resultant copolymer contained 180 ppm of allylsilane. The MI of the copolymer was 7.5 g/10 min., the crystallizing temperature was 123.5° C., the melting point was 160.5° C., the flexural rigidity was 12,300 kg/cm$^2$, the peel strength was not less than 2 kg/cm, and the numbers of cross-cut residual coated films were respectively 95 and 100 out of 100, the both numbers being estimated as excellent.

EXAMPLE 5

In order to determine the strength of adhesion between the sheet obtained in Example 1 and aluminum, an aluminum plate 10 μm-thick degreased with acetone was piled on the sheet in the order of aluminum plate-sheet-aluminum plate. The resulting formation was pressed at 230° C. under 10 kg/cm$^2$ for 10 minutes and then cooled with water to obtain a laminated plate. The T-type peel strength of the laminated plate was 1.6 kg/cm. When a soft iron sheet was used in place of the aluminum plate, the resulting laminated plate exhibited a T-type peel strength of 1.5 kg/cm.

EXAMPLE 6

Following the procedure of Example 1, vinylsilane was first polymerized, followed by copolymerization of ethylene and butene-1 in a hexane solvent. The copolymerization was conducted at a polymerization temperature of 70° C. under a total pressure of 10 kg/cm$^2$ and an initial hydrogen partial pressure of 3 kg/cm$^2$ until the amount of ethylene feed reached 400 g, thereby obtaining an ethylene copolymer containing 8 wt. % of butene-1. Using the copolymer, evaluation was made in the same manner as in Example 5. The T-type peel strength was found to be as good as 1 8 kg/cm$^2$. The copolymer contained 135 ppm of vinylsilane and had an MI of 15 g/10 min. at 190° C.

We claim:

1. A process for preparing a rigid crystalline α-olefin block copolymer comprising:
   (a) polymerizing an alkenylsilane in the presence of a stereoregular catalyst; and
   (b) polymerizing an α-olefin compound in the presence of a stereoregular catalyst wherein the the stereoregular catalyst of (a) and (b) comprises a transition metal compound and an organoalumium compound.

2. The process of claim 1 wherein the weight ratio of said alkenylsilane compound to the α-olefin compound is from about 1:10 to about 1:1,000,000.

3. The process of claim 1 wherein said alkenylsilane compound is selected from the group consisting of vinylsilane, allylsilane, butenylsilane and pentenylsilane.

4. The process of claim 12 wherein said α-olefin is a C$_2$-C$_{12}$ olefin.

5. The process of claim 4 wherein said α-olefin is selected from the group consisting of ethylene, propylene, butene-1, pentene-1 and a mixture of at least two of these compounds.

6. The process of claim 5 wherein said α-olefin further comprises no greater than about 20 weight percent of an olefin selected from the group consisting of hexene-1, octene-1 and 4-methylpentene-1.

7. The process of claim 1 wherein said stereoregular catalyst further comprises a stereoregularity improver.

8. The process of claim 7 wherein said stereoregularity improver is an oxygen-containing organic compound.

9. The process of claim 1 wherein said transition metal compound is a titanium halide compound.

10. The process of claim 1 wherein said organoaluminum compound is selected from the group consisting of a trialkylaluminum, a dialkylaluminum halide, an alkylaluminum sesquihalide and an alkylaluminum dihalide compound.

11. The process of claim 1 wherein said alkenylsilane polymerizing step is carried out by a solvent polymerization process at from about 0° C. to about 200° C. and from about atmospheric pressure to about 150 kg/cm$^2$.

12. The process of claim 1 wherein said alkenylsilane polymerizing step is carried out by a vapor-phase polymerization process at from about 0° C. to about 200° C. and from about atmospheric pressure to about 150 kg/cm$^2$.

13. A process for preparing a rigid crystalline α-olefin block copolymer comprising:
   (a) polymerizing an alkenylsilane compound of the formula (I)

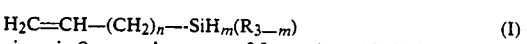

$$H_2C=CH-(CH_2)_n-SiH_m(R_{3-m}) \qquad (I)$$

wherein n is 0 or an integer of from 1 to 12, R is selected from the group consisting of a methyl, phenyl and, a halogen radical, and m is an integer of from 1 to 3 in the presence of a stereoregular catalyst; and
   (b) polymerizing an α-olefin compound in the presence of a stereoregular catalyst wherein the the stereoregular catalyst of (a) and (b) comprises a transition metal compound and an organoalumium compound.

14. The process of claim 13 wherein the weight ratio of the alkenylsilane compound to the α-olefin compound is from about 1:10 to about 1:1,000,000.

15. The process of claim 13 wherein the weight ratio of the alkenylsilane compound to the α-olefin compound is from about 1:20 to about 1:1,000,000.

16. The process of claim 13 wherein said alkenylsilane compound is selected from the group consisting of vinylsilane, allylsilane, butenylsilane and pentenylsilane.

17. The process of claim 13 wherein said α-olefin is a C$_2$-C$_{12}$ olefin.

18. The process of claim 17 wherein said α-olefin is selected from the group consisting of ethylene, propylene, butene-1, pentene-1 and a mixture of at least two of these compounds.

19. The process of claim 18 wherein said α-olefin further comprises no greater than about 20 weight percent of an olefin selected from the group consisting of hexene-1, octene-1 and 4-methylpentene-1.

20. The process of claim 13 wherein said stereoregular catalyst further comprises a stereoregularity improver.

21. The process of claim 20 wherein said stereoregularity improver is an oxygen-containing organic compound.

22. The process of claim 13 wherein said transition metal compound is a titanium halide compound.

23. The process of claim 13 wherein said organoaluminum compound is selected from the group consisting of a trialkylaluminum, a dialkylaluminum halide, an alkylaluminum sesquihalide and an alkylaluminum dihalide compound.

24. The process of claim 13 wherein said alkenylsilane polymerizing step is carried out by a solvent polymerization process at from about 0° C. to about 200° C. and from about atmospheric pressure to about 150 kg/cm$^2$.

25. The process of claim 13 wherein said alkenylsilane polymerizing step is carried out by a vapor-phase polymerization process at from about 0° C. to about 200° C. and from about atmospheric pressure to about 150 kg/cm$^2$.

26. The process of claim 17 wherein said α-olefin block copolymer has an intrinsic viscosity at 135° C. in tetralin solution of from about 0.1 to about 5 dl/g.

27. A process for preparing a material for adhesion, comprising blending the α-olefin block copolymer of claim 33 with a polyolefin.

28. A process for preparing a material for adhesion comprising blending the α-olefin block copolymer of claim 38 with a polyolefin.

29. A material for adhesion comprising the α-olefin block copolymer of claim 33 and a polyolefin wherein an alkenylsilane compound is present in an amount of from about 10 weight ppm to about 1 weight percent.

30. A material for adhesion comprising the α-olefin block copolymer of claim 38 and a polyolefin wherein an alkenylsilane compound is present in an amount of from about 10 weight ppm to about 1 weight percent.

31. A material for easy coating comprising the α-olefin block copolymer of claim 33 and a polyolefin wherein an alkenylsilane compound is present in an amount of from about 10 weight ppm to about 1 weight percent.

32. A material for easy coating comprising the α-olefin block copolymer of claim 25 and a polyolefin wherein an alkenylsilane compound is present in an amount of from about 10 weight ppm to about 1 weight percent.

33. A rigid crystalline α-olefin block copolymer prepared by
   (a) polymerizing an alkenylsilane in the presence of a stereoregular catalyst; and then
   (b) polymerizing an α-olefin compound in the presence of a stereoregular catalyst.

34. The α-olefin block copolymer of claim 33 wherein the weight ratio of said alkenylsilane compound to said α-olefin compound is from about 1:10 to about 1:1,000,000.

35. The α-olefin block copolymer of claim 33 wherein said α-olefin compound is a $C_2$–$C_{12}$ olefin.

36. The α-olefin block copolymer of claim 35 wherein said α-olefin compound is selected from the group consisting of ethylene, propylene, butene-1, pentene-1 and a mixture of at least two of said compounds.

37. The α-olefin block copolymer of claim 36 wherein said α-olefin compound further comprises no greater than about 20 weight percent of an olefin compound selected from the group consisting of hexene-1, octene-1 and 4-methylpentene-1.

38. A rigid crystalline α-olefin block copolymer prepared by
   (a) polymerizing an alkenylsilane compound of the formula (i)

$$H_2C=CH-(CH_2)_n-SiH_m(R_{3-m})  \qquad (I)$$

wherein n is 0 or an integer of from 1 to 12, R is selected from the group consisting of a methyl, phenyl and a halogen radical, and m is an integer of from 1 to 3 in the presence of a stereoregular catalyst; and
   (b) polymerizing an α-olefin compound in the presence of a stereoregular catalyst wherein the the stereoregular catalyst of (a) and (b) comprises a transition metal compound and an organoalumium compound.

39. The α-olefin block copolymer of claim 38 wherein the weight ratio of said alkenylsilane compound to said α-olefin compound is from about 1:10 to about 1:1,000,000.

40. The α-olefin block copolymer of claim 38 wherein the weight ratio of said alkenylsilane compound to said α-olefin compound is from about 1:20 to about 1:1,000,000.

41. The α-olefin block copolymer of claim 38 wherein said alkenylsilane compound is selected from the group consisting of vinylsilane, allylsilane, butenylsilane and pentenylsilane.

42. The α-olefin block copolymer of claim 38 wherein said α-olefin compound is a $C_2$–$C_{12}$ olefin.

43. The α-olefin block copolymer of claim 42 wherein said α-olefin is selected from the group consisting of ethylene, propylene, butene-1, pentene-1 and a mixture of at least two of said compounds.

44. The α-olefin block copolymer of claim 43 wherein said α-olefin further comprises no greater than about 20 weight percent of an olefin compound selected from the group consisting of hexene-1, octene-1 and 4-methylpentene-1.

45. The α-olefin block copolymer of claim 33 wherein said stereoregular catalyst further comprises a stereoregularity improver.

46. The α-olefin block copolymer of claim 45 wherein said stereoregularity improver is an oxygen-containing organic compound.

47. The α-olefin block copolymer of claim 33 wherein said transition metal compound is a titanium halide compound.

48. The α-olefin block copolymer of claim 33 wherein said organoalumium compound is selected from the group consisting of a trialkylaluminum, a dialkylaluminum halide, an alkylaluminum sesquihalide and an alkylaluminum dihalide compound.

49. The α-olefin block copolymer of claim 33 wherein said alkenylsilane polymerizing step is carried out by a solvent polymerization process at from about 0° C. to about 200° C. and from about atmospheric pressure to about 150 kg/cm$^2$.

50. The α-olefin block copolymer of claim 33 wherein said alkenylsilane polymerizing step is carried out by a vapor-phase polymerization process at from about 0° C. to about 200° C. and from about atmospheric pressure to abut 150 kg/cm$^2$.

51. The α-olefin block copolymer of claim 50 wherein said stereoregular catalyst further comprises a stereoregularity improver.

52. The α-olefin block copolymer of claim 51 wherein said stereoregularity improver is an oxygen-containing organic compound.

53. The α-olefin block copolymer of claim 38 wherein said transition metal compound is a titanium halide compound.

54. The α-olefin block copolymer of claim 38 wherein said organoaluminum compound is selected from the group consisting of a trialkylaluminum, a dialkylaluminum halide, an alkylaluminum sesquihalide and an alkylaluminum dihalide compound.

55. The α-olefin block copolymer of claim 38 wherein said alkenylsilane polymerizing step is carried out by a solvent polymerization process at from about 0° C. to about 200° C. and from about atmospheric pressure to about 150 kg/cm$^2$.

56. The α-olefin block copolymer of claim 38 wherein said alkenylsilane polymerizing step is carried out by a vapor-phase polymerization process at from about 0° C. to about 200° C. and from about atmospheric pressure to about 150 kg/cm$^2$.

57. The α-olefin block copolymer of claim 42 wherein said α-olefin block copolymer has an intrinsic viscosity at 135° C. in tetralin solution of from about 0.1 to about 5 dl/g.

* * * * *

UNITED STATES PATENT AND TRADEMARK OFFICE
CERTIFICATE OF CORRECTION

PATENT NO. : 5,045,597
DATED : September 3, 1991
INVENTOR(S) : Asanuma et al

It is certified that error appears in the above-identified patent and that said Letters Patent is hereby corrected as shown below:

On title page, item [30], Foreign
Priority Date, line 3, amend "Feb. 8, 1988" to --Aug. 2, 1988--.

In Column 7, line 67, amend "12" to --1--.

In Column 9, line 44, amend "25" to --38--; and
          line 53, after "catalyst" insert --wherein
the steroregular catalyst of (a) and (b) comprises a
transition metal compound and an organoaluminum compound--.

In Column 10, line 66, amend "50" to --38--.

Signed and Sealed this

First Day of June, 1993

Attest:

MICHAEL K. KIRK

*Attesting Officer*    *Acting Commissioner of Patents and Trademarks*